United States Patent
Johnson et al.

(10) Patent No.: US 11,900,357 B2
(45) Date of Patent: Feb. 13, 2024

(54) EMV SECURE CHIP COMMUNICATIONS

(71) Applicant: Capital One Services, LLC, McLean, VA (US)

(72) Inventors: Molly Johnson, Alexandria, VA (US); Adam Vukich, Alexandria, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 258 days.

(21) Appl. No.: 16/895,582

(22) Filed: Jun. 8, 2020

(65) Prior Publication Data

US 2021/0383356 A1 Dec. 9, 2021

(51) Int. Cl.
| | |
|---|---|
| *G06Q 40/00* | (2023.01) |
| *G06Q 20/34* | (2012.01) |
| *H04W 4/80* | (2018.01) |
| *H04W 76/10* | (2018.01) |
| *H04W 12/06* | (2021.01) |

(52) U.S. Cl.
CPC .......... *G06Q 20/341* (2013.01); *H04W 4/80* (2018.02); *H04W 12/06* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 8,046,261 | B2 * | 10/2011 | Ghosh | G06Q 30/0601 |
| | | | | 705/26.1 |
| 2014/0019352 | A1 * | 1/2014 | Shrivastava | G06Q 20/02 |
| | | | | 705/41 |
| 2016/0210451 | A1 * | 7/2016 | Hwang | G06V 40/1365 |
| 2016/0267486 | A1 * | 9/2016 | Mitra | G07F 7/0846 |
| 2017/0154328 | A1 * | 6/2017 | Zarakas | G06Q 20/204 |

FOREIGN PATENT DOCUMENTS

| | | |
|---|---|---|
| CN | 101164086 A | 4/2008 |
| WO | 2012003892 A1 | 1/2012 |
| WO | 2016168409 A1 | 10/2016 |
| WO | WO-2018235098 A1 * | 12/2018 |

* cited by examiner

*Primary Examiner* — Olabode Akintola
(74) *Attorney, Agent, or Firm* — Banner & Witcoff, Ltd.

(57) ABSTRACT

An EMV enabled terminal may communicate transaction related information to a user via a standard user interface of the terminal, for example, within a user interface displayed on a display screen of the terminal. The transaction related information may be spoken out loud to the user by the terminal. However, users with visual, audio, or other physical impairments may be unable to access the display of the terminal, view the displayed information, or hear the spoken information. Systems and methods disclosed herein communicate transaction related information via an alternate user interface. Instead of relying on the standard user interface related communications, information about the status of a transaction or transaction related information may be determined based on monitoring and evaluating the communications between an EMV secure element of a dynamic transaction card and the terminal via a contact connection.

19 Claims, 5 Drawing Sheets

EMV SECURE CHIP COMMUNICATIONS

FIELD OF USE

Aspects described herein generally relate to dynamic transaction card facilitated communication, and hardware and software related thereto. More specifically, one or more aspects describe herein facilitate communications between an EMV terminal and a user or client device via an EMV chip of a dynamic transaction card.

BACKGROUND

Short range wireless protocols, such as near field communication (NFC), WiFi, WiFi Direct, Bluetooth®, Bluetooth® Low Energy (BLE), RFID, or any equivalent thereof, allow communication between wireless enabled devices separated by relatively short distances. Wireless enabled devices include a built-in radio antenna (transmitters and receivers) that may simultaneously send and receive wireless signals from other devices.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to one aspect, an application executing on a processor of a smart chip or secure element of a wireless enabled transaction card (a smart card or dynamic transaction card) may monitor and evaluate the communications between the processor and the terminal via a contact connection and determine transaction related information that is to be communicated to a user. The terminal may be configured to authenticate the transaction using the secure element of the dynamic transaction card. The application may cause the transaction related information to be sent by the dynamic transaction card, wirelessly or via another communications path, to the user device. The user device may then communicate the received information in a manner that is understood by a user with an indicated physical and/or cognitive impairment. For example, the information may be communicated to the user via a display of the user device. The user device may be a portable computing device comprising assistive technology and capable of communicatively connecting to the dynamic transaction card.

According to another aspect, an application executing on the terminal may monitor and evaluate communications between the processor and the terminal via a contact connection and determine, based on evaluating the communications, transaction related information that is to be communicated to the user. The application executing on the terminal may cause the transaction related information to be sent from the terminal to the user device wirelessly or via another communications path. The user device may then communicate the received transaction related information in a manner that is understood by a user with an indicated impairment. For example, the information may be communicated to the user via a display of the user device. The user device may be a portable computing device comprising assistive technology and capable of communicatively connecting to the terminal.

The user device may include a mobile phone, an electronic braille refreshable device, a speech to text converter, a text to speech converter, a wearable device, or a haptic device. In some cases, the assistive technology device may be connected to the user device, for example, a haptic braille reader attached to a mobile device. The user device may include short range wireless protocol enabled hardware and software components, such as Near Field Communication (NFC) hardware and software components, or BLUETOOTH input/output hardware and software, and/or other wireless communications hardware and software and one or more processors, various input/output interfaces, and/or systems. The wireless communication protocol may be a reduced power communication protocol, similar to Bluetooth Low Energy (BLE) or any other suitable reduced power (e.g., ~5 ma/transmission) communications protocol (e.g., BLE, NFC), to reduce the power required by the user device.

In this manner, the systems and methods disclosed herein provide an alternate user interface for users with visual, audio, or other physical impairments that may prevent the users from interfacing with a standard user interface provided by a terminal. Additionally, by determining transaction related information, based on the communications between the processor and the terminal instead of the terminal's standard interface related communications, there is no need to translate or convert the terminal's standard user interface related communications into a variety of formats compatible with the displays of a variety of user devices which may be impractical to do.

According to one aspect, the disclosure relates to a computer-implemented method that includes evaluating, by a dynamic transaction card, a plurality of communications associated with a transaction and transmitted between a secure element, such as an EMV secure element, of the dynamic transaction card and a terminal. The terminal may be an EMV-compliant terminal configured to authenticate a transaction using the secure element of the dynamic transaction card. The secure element of the dynamic transaction card is communicatively coupled to the terminal via a contact connection to provide an interface between the terminal and a user device associated with a user of the dynamic transaction card. The user device comprises a portable computing device comprising assistive computer technology. The computer-implemented method includes determining, by the dynamic transaction card and based on the evaluating, information associated with the transaction to be communicated by the dynamic transaction card to the user device. The computer-implemented method converting the information, by the dynamic transaction card, into a format compatible with the user device. The computer-implemented method includes sending, by the dynamic transaction card, the converted information to the user device.

According to another aspect, the disclosure relates to an apparatus that includes one or more processors, and a memory storing computer-readable instructions. The computer-readable instructions, when executed by the one or more processors, cause the apparatus to evaluate a plurality of communications associated with a transaction and transmitted between a secure element of a dynamic transaction card and a terminal. The terminal may be an EMV-compliant terminal configured to authenticate a transaction using the secure element of the dynamic transaction card. The secure element of the dynamic transaction card is communicatively coupled to the terminal via a contact connection to provide an interface between the terminal and a user device associated with a user of the dynamic transaction card. The user device comprises a portable computing device comprising assistive computer technology. The instructions, when executed by the one or more processors, may cause the apparatus to determine, based on the evaluating, information associated with the transaction to be communicated by the dynamic transaction card to the user device, convert the information into a format compatible with the user device, and send the converted information to the user device.

According to another aspect, the disclosure relates to non-transitory machine-readable medium storing instructions that, when executed by one or more processors, cause the one or more processors to perform steps comprising evaluating, by a dynamic transaction card, a plurality of communications associated with a transaction and transmitted between a secure element, such as an EMV secure element, of the dynamic transaction card and a terminal configured to authenticate the transaction using the secure element of the dynamic transaction card. The secure element of the dynamic transaction card is communicatively coupled to the terminal via a contact connection. A user device comprises a portable computing device comprising a mobile device, a haptic device, a screen reader, a refreshable braille display, a wearable device, an artificial vision device, a hearing aid, or a haptic braille device. The steps further comprise determining, by the dynamic transaction card and based on the evaluating, information associated with the transaction to be communicated by the dynamic transaction card to the user device; converting the information, by the dynamic transaction card, into a format compatible with the user device; and establishing, by the dynamic transaction card, wireless communication with the user device the dynamic transaction card. The wireless communication comprises a short-range wireless communication protocol. The steps further comprise sending, by the dynamic transaction card and via the wireless communication, the converted information to the user device. The user device is configured to, after receiving the converted information, translate the converted information into a user understandable format, and output the translated information.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for utilizing secure communications of smart cards. Smart cards or dynamic transaction cards may include EuroPay-MasterCard-Visa (EMV) cards that include a smart chip (e.g. EMV secure element) and/or an integrated circuit that includes a microprocessor (e.g. EMV processor), and/or a memory. When the smart card is used at a terminal, the terminal may communicate with the smart chip of the smart card to conduct a secure transaction. The terminal may be any smart card compliant terminal that uses the smart chip or EMV secure element to authenticate a transaction using the smart card and conducted via the terminal. As part of the transaction, the terminal may engage in contact-less communications (i.e. wireless communications) with the smart card including the smart chip or EMV secure element. An application executing on the terminal may, based on data received from the secure element via the contact-less communications, determine transaction related information that is to be communicated to a user associated with the transaction. The terminal may communicate the transaction related information to the user via a standard user interface of the terminal. For example, the transaction related information may be communicated to the user within a user interface displayed on a display screen of the terminal. The transaction related information may be spoken out loud to the user by the terminal. However, users with visual, audio, or other physical impairments may be unable to access the display of the terminal, view the displayed information, or hear the spoken information. Thus, it may be useful for the terminal's standard user interface related communications to be provided in a manner that may be understood by a user with an indicated impairment. As an example, the transaction related information that is displayed on a display screen of the terminal may also be displayed on a display of a user device by sending the information from the terminal to the user device. The user device may then display the received communications to the user. However, this may be impractical as it would require the terminal to translate or convert the terminal's standard user interface related communications into a variety of formats compatible with the displays of a variety of user devices.

Systems as described herein may utilize secure smart card communications to provide a non-standard communication interface for users with physical and/or cognitive disabilities. Transaction related information may be communicated via an alternate or non-standard user interface for users with visual, audio, and/or other physical impairments that may prevent the users from interfacing with the standard user interface provided by the terminal. Instead of relying on the standard user interface related communications, information about the status of a transaction and/or transaction related information may be determined based on monitoring and evaluating the communications between the processor of the smart chip or EMV secure element and the terminal. When the card is inserted into a card reader of a terminal, the terminal is able to establish a contact connection with the processor via a plurality of contact pads or points positioned on the exterior of the card and communicatively coupled to the processor of the secure element.

In this manner, the systems and methods disclosed herein improve point-of-sale transactions by providing an alternate user interface for users with visual, audio, or other physical and/or cognitive impairments. In this regard, various types of impairments may prevent users from interfacing with a standard user interface provided by a smart card compliant terminal. By having a dynamic transaction card convert information from a terminal and provide the converted information to a portable computing device with assistive technology and vice versa, the dynamic transaction card provides an improved point-of-sale experience for users with physical and/or cognitive impairments that might not otherwise be able to interact with the smart card compliant terminal. Additionally, by determining transaction related information, the dynamic transaction card may be capable of translating and/or converting a plurality of smart card compliant terminal interfaces into a single interface that allows the user to interact with the plurality of smart card compliant terminal interfaces.

Figure 1:
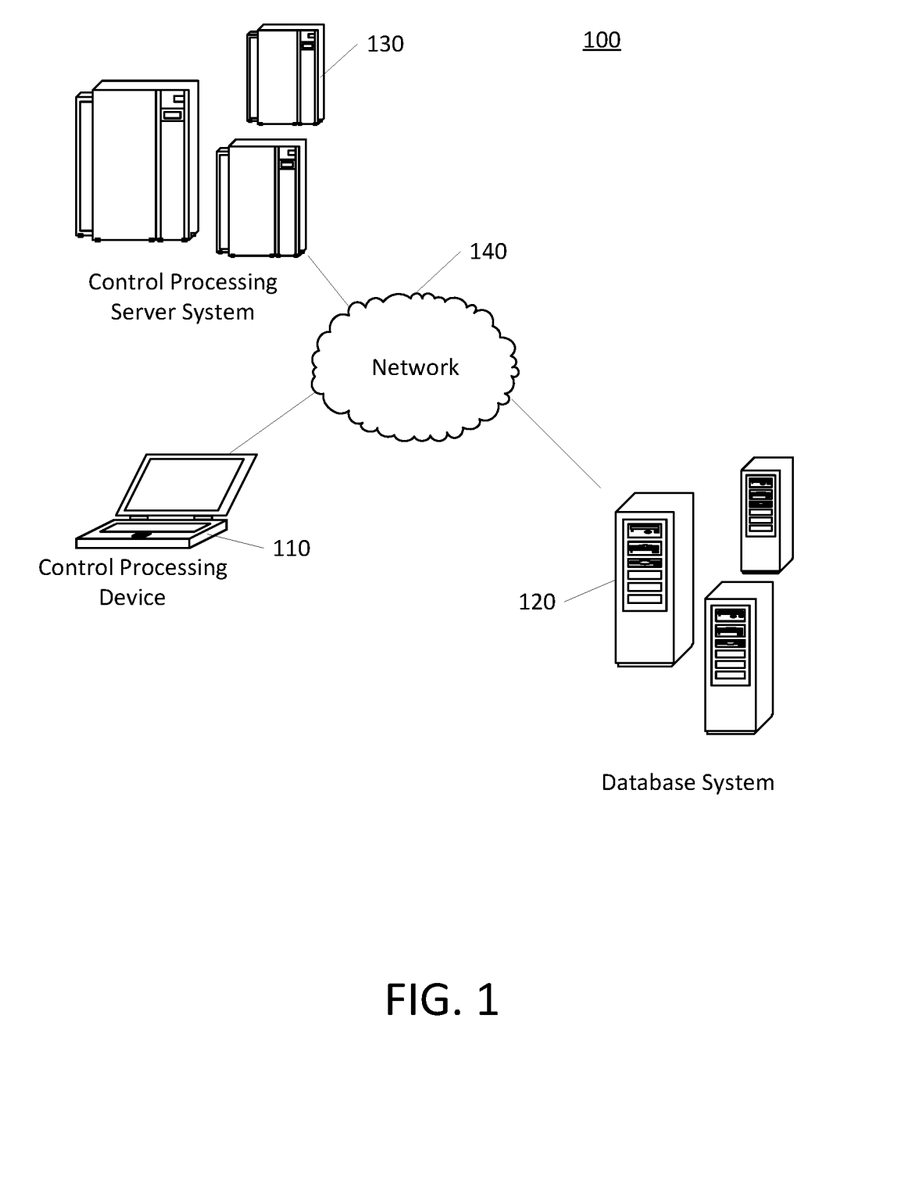
FIG. 1 shows an example of a control processing system in which one or more aspects described herein may be implemented.

FIG. 1 shows a system 100. The system 100 may include at least one client device 110, at least one database system 120, and/or at least one server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client device 110 may access server applications and/or resources using one or more client applications (not shown) as described herein. Client device 110 may be a mobile device, such as a laptop, smart phone, or tablet, or computing devices, such as a desktop computer or a server. Alternatively, client device 110 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 120 may be configured to maintain, store, retrieve, and update information for server system 130. Further, database system may provide server system 130 with information periodically or upon request. In this regard, database system 120 may be a distributed database capable of storing, maintaining, and updating large volumes of data across clusters of nodes. Database system 120 may provide a variety of databases including, but not limited to, relational databases, hierarchical databases, distributed databases, in-memory databases, flat file databases, XML databases, NoSQL databases, graph databases, and/or a combination thereof.

Server system 130 may be configured with a server application (not shown) that is capable of interfacing with client application and database system 120 as described herein. In this regard, server system 130 may be a stand-alone server, a corporate server, or a server located in a server farm or cloud-computer environment. According to some examples, server system 130 may be a virtual server hosted on hardware capable of supporting a plurality of virtual servers.

Network 140 may include any type of network. For example, network 140 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
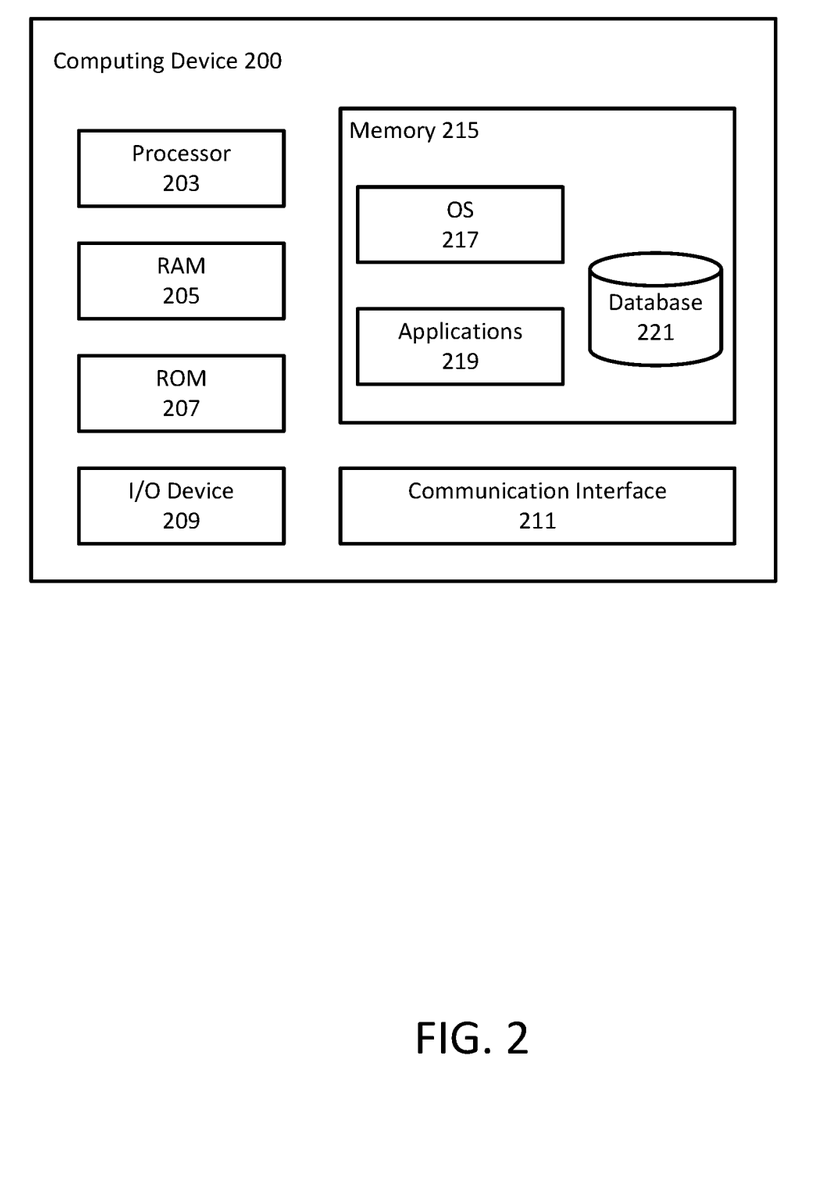
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device. Additionally or alternatively, computing device 200 may represent, be incorporated in, and/or include various devices such as a terminal, a point-of-sale terminal, a card reader, an EMV-compliant terminal or card reader, a cash register, a mobile payment device, portable computing device comprising assistive technology, such as an electronic haptic braille reader and/or display, a haptic device, speech to text device, text to speech device, and/or any other type of data processing device capable of assisting users with visual, audio, and/or other impairments and/or transacting with an EMV card or capable of authenticating a transaction via an EMV secure element of the EMV card.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3A:
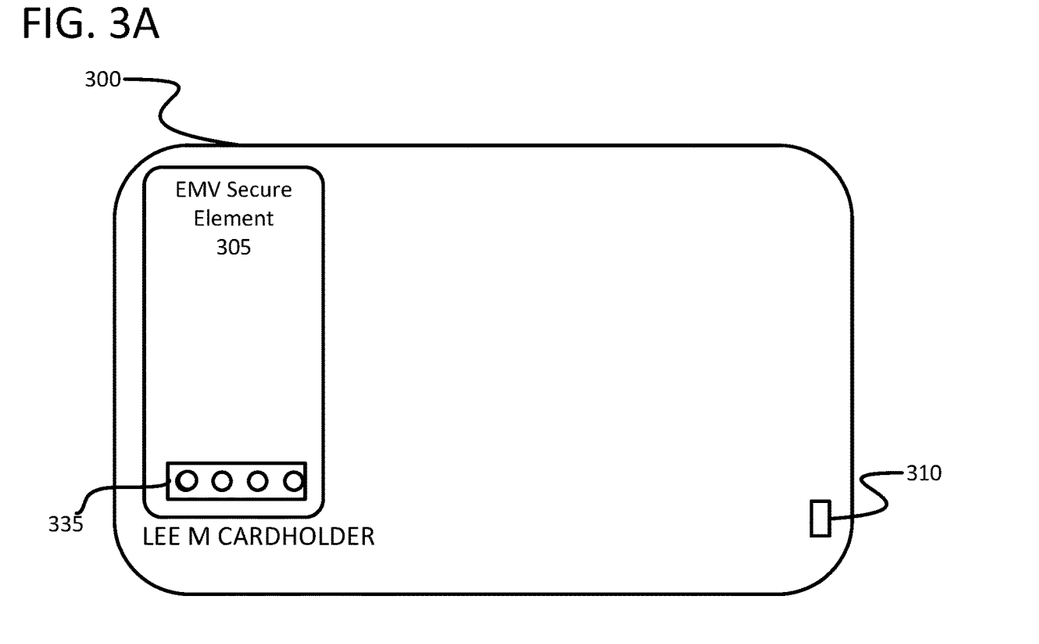
FIG. 3A shows an example dynamic transaction card.
Figure 3B:
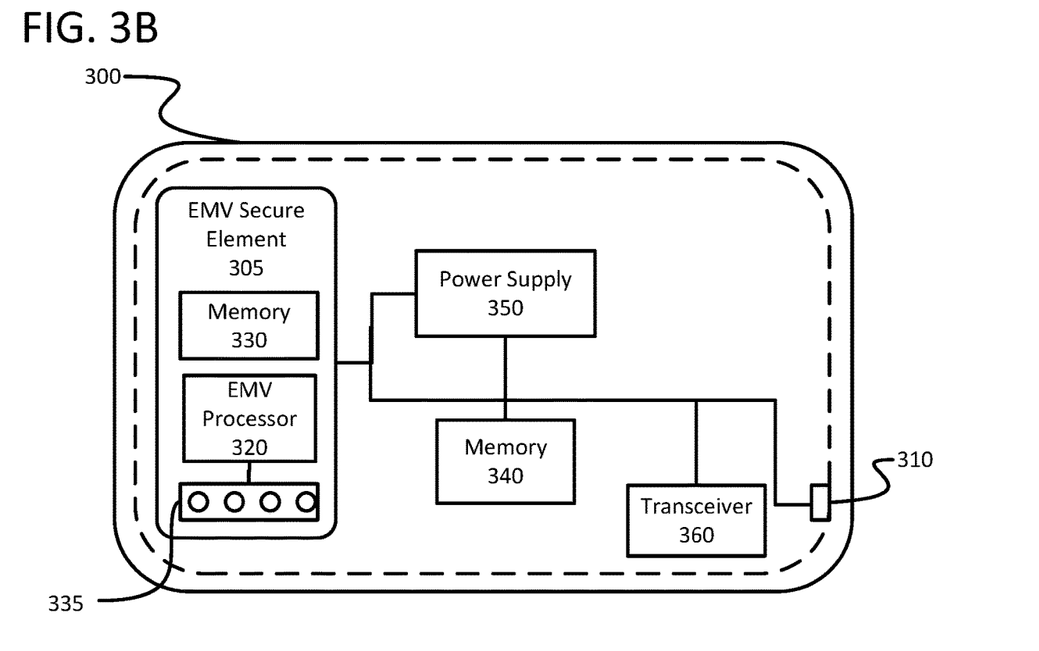
FIG. 3B shows an example of hardware of the dynamic transaction card in FIG. 3A.

FIG. 3A shows an example of a dynamic transaction card 300. FIG. 3B shows an example of the hardware of the dynamic transaction card 300 in FIG. 3A. The dynamic transaction card 300 may include a flexible circuit board on which an EMV secure element 305, a charging port 310, a first memory 340, a power supply or battery 350, and a transceiver 360, may be mounted. The EMV secure element 305 may be a smart chip or an integrated circuit. In this regard, the EMV secure element 305 may include a microprocessor 320, such as an EMV processor, a second memory 330, such as read only memory (ROM) and/or random access memory (RAM), and contact pads 335. The processor 320 may communicate with an applet and/or application stored in the second memory 330. For example, data may be communicated between the processor 320 and the applet and/or application in the second memory 330 in a secure manner so that an applet and/or application residing within the first memory 340 of the dynamic transaction card 300 may receive the data. A number of configurations may be used to transmit and/or receive data between an applet/application in the second memory 330 and the processor 320. The dynamic transaction card 300 and, in particular, transceiver 360 may be configured to communicate with a terminal via a wireless communication protocol. For example, transceiver 360 may be configured with a short range wireless communication protocol, such as BLUETOOTH. The second memory 330 of the EMV secure element 305 may include an applet that provides instructions that, when executed, decrypts a received encrypted handshake in order to validate and/or create a BLUETOOTH and/or BLUETOOTH low energy (BLE) connection. The EMV secure element 305 may store a private key for validating an encrypted handshake received from another device, such as user device, mobile device, and/or a transaction/point-of-sale terminal (e.g., EMV-compliant terminal). The EMV secure element 305 may store the private key in the second memory 330 of the EMV secure element 305.

Additionally, the EMV secure element 305 may include the contact pads 335 to receive voltage to power the dynamic transaction card 300 and/or exchange signals with a terminal, such as mobile device and/or a card reader of an EMV terminal. The contact pads 335 may be positioned on the exterior of the dynamic transaction card 300 and communicatively coupled to the processor 320. When the dynamic transaction card 300 is inserted into a card reader of a transaction/point-of-sale terminal (e.g., EMV terminal), a contact connection may be established between the terminal and the dynamic transaction card 300 via the contact pads 335. The terminal may communicate directly with the EMV processor 345 via the contact connection. The contact pads 335 may be directly connected and/or adjacent to the processor 320. The contact pads 335 may be physically coupled to the processor 320 via electrical wiring, jumpers, etc.

In some implementations, the EMV secure element 305 may be configured to execute one or more applications. The applications may allow the EMV secure element 305 to process payments, for example, using a payment application. In further examples, one or more applications may allow the EMV secure element 305 to perform cryptographic processing, authenticate the dynamic transaction card 300, define risk management parameters (e.g., when the transaction may be conducted offline), digitally sign payment data, and verify the cardholder. Additionally, or alternatively, the EMV secure element 305 may be a dual interface chip that provides for contact and contact-less interfaces.

The charging port 310 may be configured to receive a cable to supply power to recharge the power supply 350. In this regard, the charging port 310 may be mounted to a surface of the dynamic transaction card 300. In alternative implementations, the charging port 310 may be mounted to an edge of the dynamic transaction card 300. In some implementations, the charging port 310 may include one or more solar cells configured to provide power to the power supply 350. The power supply 350 may include an inductive coil to recharge the power supply via electromagnetic induction, obviating the need for the charging port 310.

The first memory 340 may be any type of media capable of storing data and/or information accessible by the EMV secure element 305. Accordingly, the first memory 340 may include a hard-drive, a solid state drive, memory card, flash drive, ROM, RAM, or other optical disks, as well as other write-capable and read-only memories. The first memory 340 may include short term or temporary storage as well as long term or persistent storage.

The power supply 350 may be any suitable power source capable of providing power to the dynamic transaction card 300. The power supply 350 may be a battery mounted on, or in, the dynamic transaction card 300. Accordingly, the power supply 350 may be a small, thin battery capable of being mounted on flexible circuit board between two substrate layers. In this regard, power supply 350 may be a rechargeable battery, such as a lithium-ion (Li-ion), lithium-ion polymer (Li-ion polymer), nickel-cadmium (NiCd), nickel-metal hydride (NiMH), or any equivalent thereof. In other instances, power supply 350 may be disposable battery capable of being replaced. In some embodiments, power supply 350 may include an inductive coil that allows the power supply 350 to be recharged via electromagnetic induction. In further embodiments, the power supply 350 may be one or more solar cells.

The transceiver 360 may be configured to exchange signals with a transaction/point-of-sale terminal (e.g., an EMV-compliant terminal) and/or a user device. The transceiver 360 may include an antenna or any other communication capabilities, or any combination of hardware, software, and/or firmware that enable wireless communications. The wireless communications may include any suitable wireless communication protocol. In some examples, the wireless communication protocol may be a reduced power communication protocol, similar to Bluetooth Low Energy (BLE) or any other suitable reduced power (e.g., ~5 ma/transmission) communications protocol (e.g., BLE, NFC). By using a reduced power communication protocol, the power requirements of the transaction card may also be reduced. The transceiver 360 may be configured to permit the dynamic transaction card 300 to communicate with a card reader of a transaction/point-of-sale terminal (e.g., an EMV-compliant terminal) and/or a mobile/user device. In other embodiments, the transceiver 360 may comprise a short-range wireless transceiver configured to exchange signals with a card reader of a terminal and/or mobile device.

Figure 4:
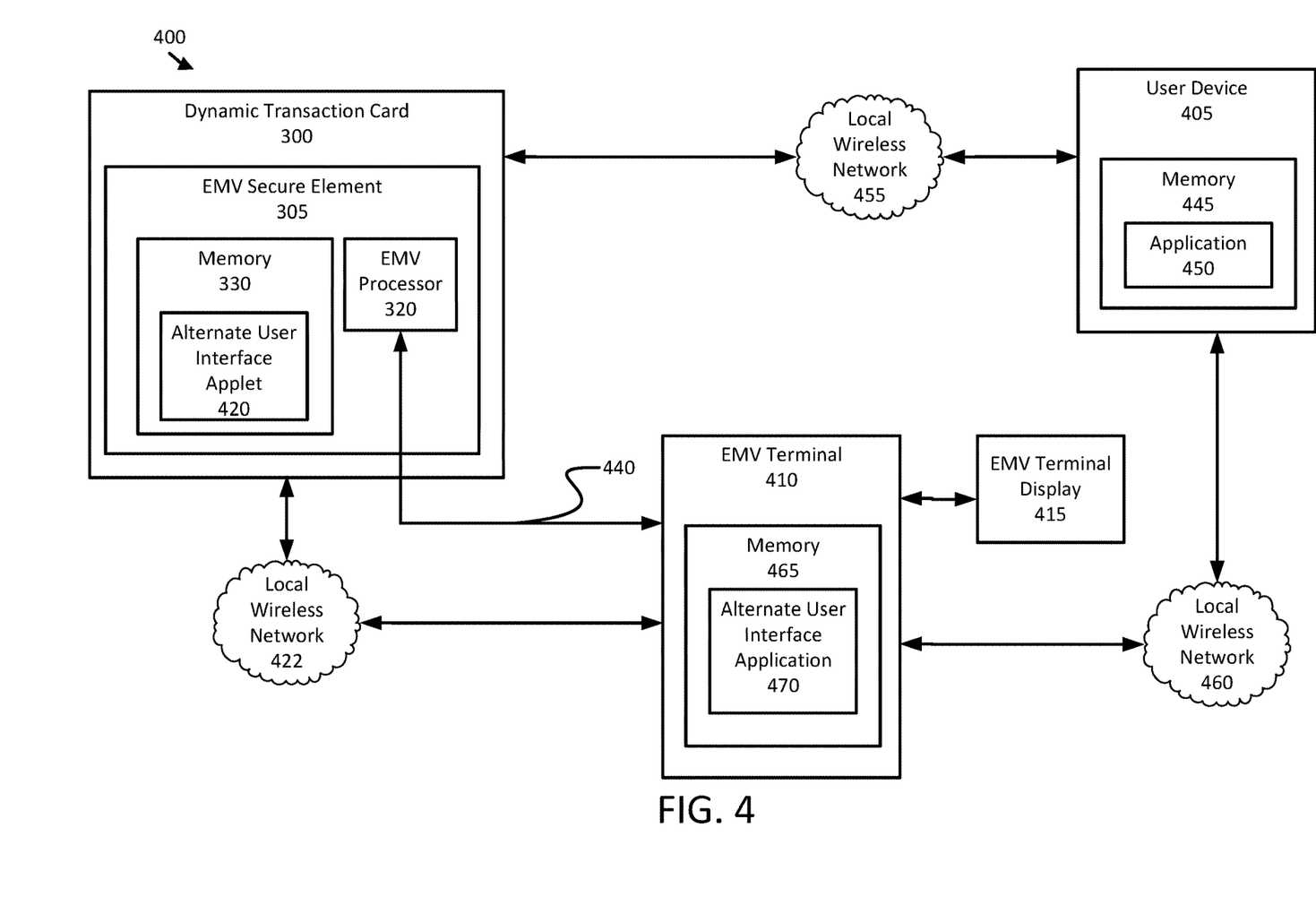
FIG. 4 shows an example system utilizing EMV secure chip communications.

FIG. 4 shows an example system 400 for utilizing EMV secure chip communications. The system 400 may include the dynamic transaction card 300 shown in FIGS. 3A and 3B, a user device 405, and a terminal 410. The terminal 410 may be an EMV terminal, a Point of Sale (POS) terminal, an ATM, and/or any computing device that uses the EMV secure element 305 of the dynamic transaction card 300 as an authenticator for a transaction conducted at the EMV terminal 410. The terminal 410 may include an input slot to receive the dynamic transaction card 300, a card reader (e.g., an EMV card reader), a display 415 of the terminal 410, a processor, an input/output component, one or more antennae (e.g., antennae supporting NFC, RFID, BLE, WiFi, WiFi Direct, etc.), a memory 465, a magnetic strip reader, etc.

The dynamic transaction card 300 may be powered up, and/or activated when it is inserted into the card reader of the terminal 410. When activated, the dynamic transaction card 300 and the terminal 410 may communicate with each other wirelessly and/or via a contact connection. For example, the EMV secure element of the dynamic transaction card and the terminal 410 may transmit data to each other wirelessly (e.g. RFID, NFC, BLE, WiFi, WiFi Direct, and/or other wireless communications) via a first local wireless network 420 or personal area network (PAN). The wireless communications may comprise a short-range wireless communication protocol.

The dynamic transaction card 300 and the terminal 410 may also communicate with each other via a contact connection 440. Referring back to FIG. 3B, the EMV terminal 405 and the dynamic transaction card 300 may connect with each other via the contact pads 335 positioned on the exterior of the dynamic transaction card 300 and communicatively coupled to the EMV processor 320. When the dynamic transaction card 300 is inserted into the card reader of the terminal 410, the contact connection 440 may be established between the terminal 410 and the EMV processor 320 via the contact pads 335 of the EMV secure element 305. The contact connection 440 may be utilized to provide an alternate user interface for the terminal 410 for users with auditory, visual, and/or other physical and/or cognitive impairments.

According to one aspect, the second memory 330 of the EMV secure element 305 may include one or more applications or applets, such as the alternate user interface applet 420. The alternate user interface applet 420 may be configured to monitor and/or evaluate the communications between the EMV processor 320 and the terminal 410 via the contact connection 440. The communications may be associated with a transaction conducted at the terminal 410 using the dynamic transaction card 300. The alternate user interface applet 420 may be configured to determine, based on an evaluation of the communications between the terminal 410 and the EMV processor 320, information associated with a transaction and/or transaction related information that is to be communicated to a user. The alternate user interface applet 420 may be configured to convert the transaction related information into a format compatible with the user device 405. The alternate user interface applet 420 may be configured to send the converted transaction related information to the user device 405 wirelessly (e.g. RFID, NFC, BLE, WiFi, WiFi Direct, and/or other wireless communications) via a second local wireless network 455 or personal area network (PAN). The wireless communications may comprise a short-range wireless communication protocol.

According to another aspect, the memory 465 of the terminal 410 may include one or more applications, such as the alternate user interface application 470. The alternate user interface application 470 may be configured to monitor and/or evaluate the communications between the EMV processor 320 and the terminal 410 via the contact connection 440. The communications may be associated with a transaction conducted at the terminal 410 using the dynamic transaction card 300. The alternate user interface application 470 may be configured to determine, based on an evaluation of the communications between the terminal 410 and the EMV processor 320, information associated with a transaction and/or transaction related information that is to be communicated to a user. The alternate user interface application 470 may be configured to convert the transaction related information into a format compatible with the user device 405. The alternate user interface application 470 may be configured to send the converted transaction related information to the user device 405 wirelessly (e.g. RFID, NFC, BLE, WiFi, WiFi Direct, and/or other wireless communications comprising a short-range wireless communication protocol) via a third local wireless network 460 or personal area network (PAN). By having applications that convert information for users with impairments, an impaired person's point-of-sale experience may be improved. As described above, the terminal 410 may communicate directly with the EMV processor 420 via a contact connection. During an EMV interaction, application cryptograms may be used to send and receive data packets between the dynamic transaction card 305 and the terminal 410. For example, data packets may include user authentication information which an acquisition system and/or issuing institution may use to authenticate the dynamic transaction card 305 during a transaction. Various cryptographic protocols and/or methods may be used in this data transmission and reception process. Moreover, during a transaction, issuing institutions and/or acquisition systems may return script commands to the EMV processor 320 via the terminal 410. These script commands and/or data packets may be transmitted between parties over a network. Script commands may be used, for example, to block transactions, change transaction data stored on the EMV processor 320 (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

A memory 445 of the user device 405 may include an application 450. The application 450 may be configured to receive data from the dynamic transaction card 300 and/or communicate the data to the user of the user device 405. For example, the user device 405 and the dynamic transaction card 300 may be paired with each other such that once the dynamic transaction card 300 and the user device 405 are paired, a secure communications channel may be established for all future communications. In this example, the dynamic transaction card 300 may include security features that enable the dynamic transaction card 300 to pair with the user device 405.

One or more impairment settings may be stored in the memory 445 of the user device 405 or the memory 330 of the dynamic transaction card 300. The dynamic transaction card 300 may, in conjunction with the impairment settings, provide different non-standard interfaces that may be understood by users with different physical impairments. For example, a user of the user device 405 may provide the impairment settings to the dynamic transaction card 300. The impairment settings may be transmitted to the dynamic transaction card 300 via a network, such as the local wireless network 455. The impairment settings may indicate a particular impairment, for example a visual impairment, such as nearsightedness, farsightedness, glaucoma, or other visual impairments, or for example, an audio impairment. The impairment settings may include instructions that when executed on the EMV processor 320 instruct the dynamic transaction card 300 to provide a non-standard interface in a manner that may be understood by the user with the indicated impairment.

Figure 5:
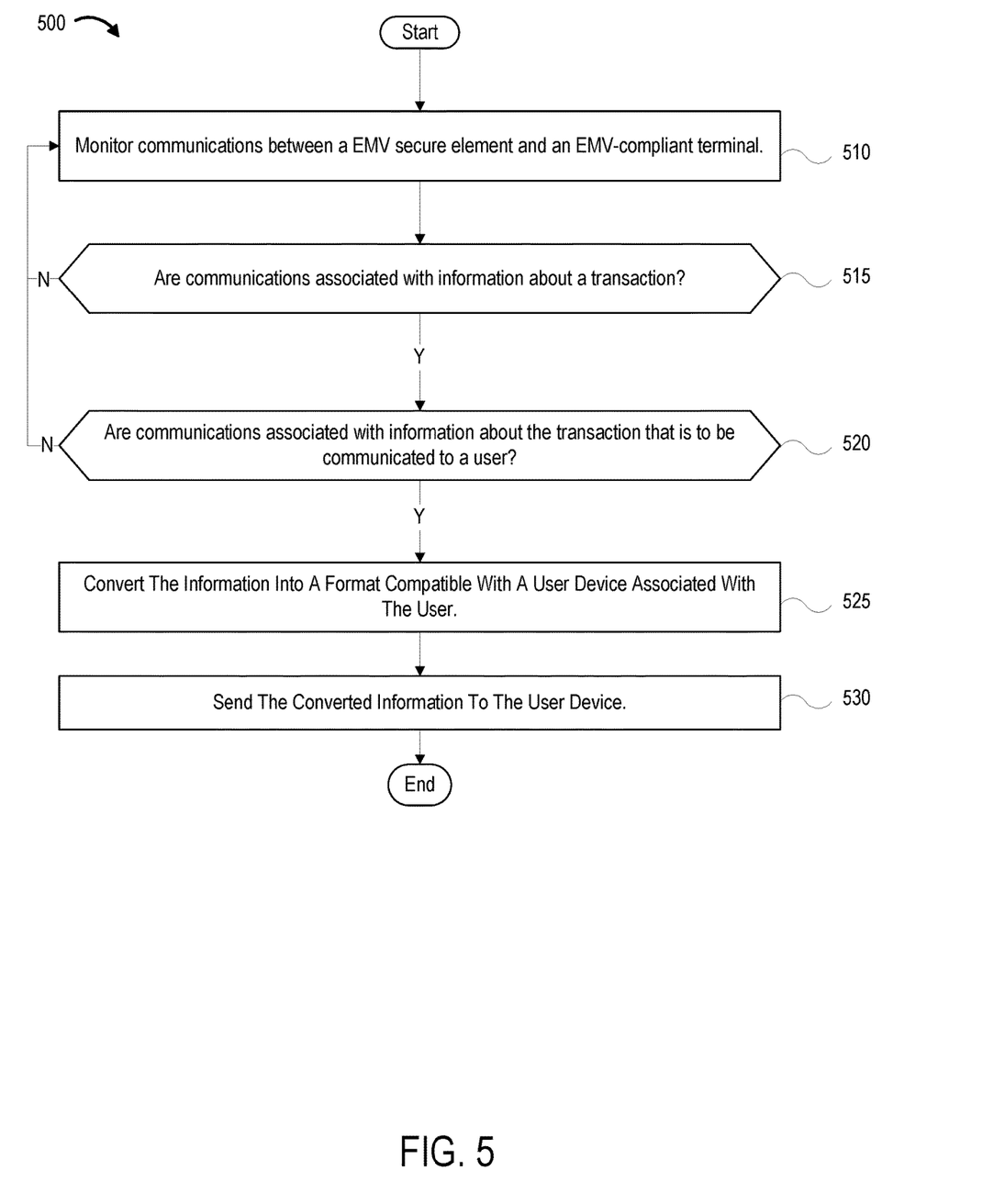
FIG. 5 shows a flow diagram of an example method for utilizing EMV secure chip communications.

FIG. 5 is a flow diagram of an example method 500 for performing a transaction utilizing EMV secure communications. Some or all of the steps of method 500 may be performed using one or more computing devices as described herein, including, for example, dynamic transaction card 300 (e.g. the alternate user interface applet 420 executing on the dynamic transaction card 300) and/or the terminal 410 (e.g., the alternate user interface application 470 executing on the terminal 410). The steps of the method 500 may be modified, omitted, and/or performed in other orders, and/or other steps added.

A card holder of the dynamic transaction card (e.g., dynamic transaction card 300) may attempt to conduct a transaction at a terminal (e.g., terminal 410). The terminal may be any EMV-compliant terminal that uses the EMV secure element of the dynamic transaction card as an authenticator for a transaction. As an example, the terminal may be a ticket kiosk in an airport. A user that purchased a ticket online using the dynamic transaction card may approach the terminal in order to print out the purchased ticket. When the card holder inserts the dynamic transaction card into the card reader of the terminal, the dynamic transaction card may be powered up and/or activated. A contact connection (e.g., contact connection 440) may be established between the terminal and the dynamic transaction card. The processor (e.g., processor 320) of the dynamic transaction card and the terminal may communicate with each other.

At step 510, a computing device (e.g. the alternate user interface applet 420 executing on the dynamic transaction card 300 and/or the alternate user interface application 470 executing on the EMV terminal 410) may monitor communications between a processor of a dynamic transaction card and the terminal via a contact connection. Some of the communications may be related to the transaction currently being conducted at the terminal.

At step 515, the computing device (e.g. the alternate user interface applet 420 executing on the dynamic transaction card 300 and/or the alternate user interface application 470 executing on the terminal 410) may determine whether the monitored communications are associated with the transaction being conducted at the terminal using the dynamic transaction card. For example, the terminal may authenticate the transaction using a secure element (e.g., EMV secure element 305) of the dynamic transaction card. The terminal may determine that the dynamic transaction card was used for purchasing a ticket. After authenticating the transaction, the terminal may print the ticket. If the monitored communications are not associated with a transaction being conducted at the terminal, the method 500 returns to step 510. Otherwise, the method 500 proceeds to step 520.

At step 520, the computing device (e.g. the alternate user interface applet 420 executing on the dynamic transaction card 300 and/or the alternate user interface application 470 executing on the terminal 410) may determine whether the transaction related information is to be communicated to a user associated with the transaction. Referring to the example above, communications indicating that the transaction is authenticated and the ticket has been printed may be communicated to the user via both a standard and non-standard interface. The communications to the user may be via a non-standard interface based on one or more impairment settings stored on or communicated to the dynamic transaction card 300. For example, the standard interface of the terminal may simply speak out loud "Ticket printed. Please take ticket." However, the standard interface communications may not be understandable to a visually impaired user. Thus, if this information is determined to be transaction related information, then based on the impairment settings, the information may be communicated to the user via the non-standard interface. If the transaction related information is not to be communicated to a user device associated with the transaction, then the method 500 returns to step 510. Otherwise, the method 500 proceeds to step 525.

At step 525, the computing device (e.g. the alternate user interface applet 420 executing on the dynamic transaction card 300 and/or the alternate user interface application 470 executing on the terminal 410) may convert the transaction related information into a format compatible with the user device. Referring again to the example above, the information related to the printing of the ticket may be converted into a format compatible with the user device. Thus, a dynamic transaction card that converts transaction related information from a terminal and provides the converted information to a portable computing device with assistive technology may improve a smart card compliant terminal experience for users with physical and/or cognitive impairments that might not otherwise be able to interact with the standard communications interface of the terminal.

At step 530, the computing device (e.g. the alternate user interface applet 420 executing on the dynamic transaction card 300 and/or the alternate user interface application 470 executing on the terminal 410) may send the converted information to the user device. After the user device 405 receives the converted information, the user device 405 may further translate the converted information into a user understandable format, and output the translated information to the user. The user device 405 may translate the converted into a user understandable format based on one or more impairment settings stored on the user device 405. Referring to the example above, the user device 405 may receive the information and display the words "Ticket printed. Remove card" on a display of the user device 405. As another example, the user device 405 may comprise an electronic haptic braille reader and the information "Ticket printed. Remove card" may be provided to the user via the haptic braille reader.

In this manner, the systems and methods disclosed herein improve transactions conducted at smart card compliant terminals by providing an alternate user interface for users with visual, audio, or other physical and/or cognitive impairments. In this regard, various types of impairments may prevent users from interfacing with a standard user interface provided by a smart card compliant terminal. By having a dynamic transaction card convert information from a terminal and provide the converted information to a portable computing device with assistive technology and vice versa, the dynamic transaction card provides an improved smart card compliant terminal experience for users with physical and/or cognitive impairments that might not otherwise be able to interact with the smart cart compliant terminal. Additionally, by determining transaction related information, the dynamic transaction card may be capable of translating and/or converting a plurality of smart card compliant terminal interfaces into a single interface that allows the user to interact with the plurality of smart card compliant terminal interfaces.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   evaluating, by a dynamic transaction card, a plurality of communications associated with a transaction and transmitted between an EuroPay-MasterCard-Visa (EMV) secure element of the dynamic transaction card and an EMV-compliant terminal, wherein:
      the EMV secure element of the dynamic transaction card is communicatively coupled to the EMV-compliant terminal via a contact connection to provide an interface between the EMV-compliant terminal and a user device associated with a user of the dynamic transaction card; and
      the user device comprising assistive computer technology adapted to a physical or cognitive impairments of the user;
   determining, by the dynamic transaction card and based on the evaluating, information associated with the transaction to be communicated by the dynamic transaction card to the user device, wherein the information associated with the transaction is in a first format displayable via a standard interface of the EMV-compliant terminal;

converting, by the dynamic transaction card and based on an impairment setting associated with the physical or cognitive impairments of the user, the information in the first format displayable via the standard interface into a second format compatible with the impairment setting, wherein the information in the second format is displayable via an adapted interface of the user device;

sending, using a transceiver on the dynamic transaction card, the converted information to the user device; and causing, by the dynamic transaction card, the user device to:

translate the converted information into a user understandable format; and     display, on a display of the user device and via the adapted interface compatible with the impairment setting, the translated information in the user understandable format.

2. The computer-implemented method of claim 1, wherein sending the converted information to the user device comprises:

establishing wireless communication between the user device and the dynamic transaction card; and sending the converted information via the wireless communication.

3. The computer-implemented method of claim 2, wherein the wireless communication comprises a short-range wireless communication protocol.

4. The computer-implemented method of claim 1, wherein the user device comprises a mobile device, a haptic device, a screen reader, a refreshable braille display, a wearable device, an artificial vision device, a hearing aid, screen text reader, screen magnification device, or a haptic braille device.

5. The computer-implemented method of claim 1, wherein the contact connection comprises a plurality of contacts positioned on the dynamic transaction card and communicatively coupled to the EMV secure element.

6. The computer-implemented method of claim 5, wherein the plurality of contacts are physically coupled to the EMV secure element via electrical wiring or jumpers.

7. The computer-implemented method of claim 1, wherein the dynamic transaction card comprises a short-range wireless communication-enabled card.

8. The computer-implemented method of claim 1, wherein the EMV-compliant terminal is configured to authenticate the transaction using the EMV secure element of the dynamic transaction card.

9. The computer-implemented method of claim 1, further comprising:

converting information from a plurality of smart card compliant terminal interfaces into in the second format that is displayable via the adapted interface of the user device.

10. An apparatus comprising:

one or more processors; and memory storing instructions that, when executed by the one or more processors, cause the apparatus to:

evaluate a plurality of communications associated with a transaction and transmitted between an EuroPay-MasterCard-Visa (EMV) secure element of a dynamic transaction card and an EMV-compliant terminal, wherein:

the EMV secure element of the dynamic transaction card is communicatively coupled to the EMV-compliant terminal via a contact connection to provide an interface between the EMV-compliant terminal and a user device associated with a user of the dynamic transaction card; and         the user device comprising assistive computer technology adapted to a physical or cognitive impairments of the user;

determine, based on the evaluating, information associated with the transaction to be communicated by the dynamic transaction card to the user device, wherein the information associated with the transaction is in a first format displayable via a standard interface implemented on the EMV-compliant terminal;

convert, based on an impairment setting associated with the physical or cognitive impairments of the user, the information in the first format displayable via the standard interface into a second format compatible with the impairment setting, wherein the information in the second format is displayable via an adapted interface of the user device;

send, using a transceiver on the dynamic transaction card, the converted information to the user device; and     cause, by the dynamic transaction card, the user device to:

translate the converted information into a user understandable format; and         display on a display of the user device and via the adapted interface compatible with the impairment setting, the translated information in the user understandable format.

11. The apparatus of claim 10, wherein sending comprises:

establishing wireless communication with the user device; and sending the converted information via the wireless communication.

12. The apparatus of claim 10, wherein the user device comprises a mobile device, a haptic device, a screen reader, a refreshable braille display, a wearable device, an artificial vision device, screen text reader, screen magnification device, a hearing aid, or a haptic braille device.

13. The apparatus of claim 10, wherein the contact connection comprises a plurality of contacts positioned on the dynamic transaction card and communicatively coupled to the EMV secure element.

14. The apparatus of claim 10, wherein the EMV-compliant terminal is configured to authenticate the transaction using the EMV secure element of the dynamic transaction card.

15. The apparatus of claim 10, wherein the dynamic transaction card comprises a short-range wireless communication-enabled card.

16. The apparatus of claim 11, wherein the wireless communication comprises a short-range wireless communication protocol.

17. A non-transitory machine-readable medium storing instructions that, when executed by one or more processors, cause the one or more processors to perform steps comprising:

evaluating, by a dynamic transaction card, a plurality of communications associated with a transaction and transmitted between an EuroPay-MasterCard-Visa (EMV) secure element of the dynamic transaction card and an EMV-compliant terminal configured to authenticate the transaction using the EMV secure element of the dynamic transaction card, wherein:
- the EMV secure element of the dynamic transaction card is communicatively coupled to the EMV-compliant terminal via a contact connection; and
- a user device comprising a mobile device, a haptic device, a screen reader, a refreshable braille display, a wearable device, an artificial vision device, a hearing aid, or a haptic braille device that is associated with assistive computer technology adapted to a physical or cognitive impairments of a user;

determining, by the dynamic transaction card and based on the evaluating, information associated with the transaction to be communicated by the dynamic transaction card to the user device, wherein the information associated with the transaction is in a first format displayable via a standard interface implemented on the EMV-compliant terminal;

converting, by the dynamic transaction card and based on an impairment setting associated with the physical or cognitive impairments of the user, the information in the first format displayable via the standard interface into a second format compatible with the impairment setting, wherein the information in the second format is displayable via an adapted interface of the user device;

establishing, by the dynamic transaction card, wireless communication with the user device the dynamic transaction card, wherein the wireless communication comprises a short-range wireless communication protocol; and sending, using a transceiver on the dynamic transaction card and via the wireless communication, the converted information to the user device, wherein the user device is configured to, after receiving the converted information, translate the converted information into a user understandable format; and causing, by the dynamic transaction card, on a display of the user device, and via the adapted interface compatible with the impairment setting, the user device to display the translated information in the user understandable format.

18. The non-transitory machine-readable medium of claim 17, wherein the dynamic transaction card comprises a short-range wireless communication-enabled card.

19. The non-transitory machine-readable medium of claim 17, wherein the user device is configured to communicate via a short-range wireless communication.

* * * * *